United States Patent [19]

Schindler et al.

[11] Patent Number: 4,693,492

[45] Date of Patent: Sep. 15, 1987

[54] WHEEL SUSPENSION USING AN ARC SPRING

[75] Inventors: Manfred Schindler, Markt Schwaben; Walter Vilsmeier, Grosshelfendorf, both of Fed. Rep. of Germany

[73] Assignee: FICHT GmbH, Kirchseeon, Fed. Rep. of Germany

[21] Appl. No.: 846,687

[22] Filed: Apr. 1, 1986

[30] Foreign Application Priority Data

Apr. 2, 1985 [DE] Fed. Rep. of Germany ....... 3512051

[51] Int. Cl.$^4$ .......................... B60G 11/28; F16F 9/04
[52] U.S. Cl. .................................. 280/705; 267/64.27; 280/708
[58] Field of Search ............... 280/705, 702, 709, 711; 267/64.27, 64.11; 188/268

[56] References Cited

U.S. PATENT DOCUMENTS

| 3,047,283 | 7/1962 | Kivell ................................... 280/705 |
| 3,333,867 | 8/1967 | Schultze .............................. 280/709 |
| 4,171,830 | 10/1979 | Metz ................................... 280/711 |

Primary Examiner—John J. Love
Assistant Examiner—Karin L. Ferriter
Attorney, Agent, or Firm—Armstrong, Nikaido, Marmelstein & Kubovcik

[57] ABSTRACT

The invention relates to a hydropneumatic suspension system for a tracked-vehicle chassis component, having a circular-arc suspension member fitted within a housing. This circular-arc suspension member is located between a support fixed on the housing and a rotating abutment. The housing is hinged on pivot points by means of a suspension arm fixed on the housing and the abutment by means of a hinging lever. Very little space is provided for the suspension of chassis components in such vehicles. Moreover, the suspension system must also be maintenance-free and easy to assemble. According to the invention, this is accomplished either by causing the suspension arm and the hinging lever to form, together with the pivot points fixed on the vehicle and a parallel control arm connecting the hinging lever with a pivot point, a parallelogram, or by hinging the suspension arm on a lower pivot point fixed on the vehicle, and by providing a pneumatic control arm connecting a higher pivot point fixed on the vehicle with the hinging lever, and by locating in the expanded position the hinge joint between the pneumatic control arm and the hinging lever on the side, turned toward the suspension arm, or an imaginary connecting line between the pivot point and the housing axle.

14 Claims, 5 Drawing Figures

WHEEL SUSPENSION USING AN ARC SPRING

BACKGROUND OF THE INVENTION

This invention relates to a hydropneumatic suspension system for a vehicle, particularly a tracked vehicle such as an armored vehicle, and to circular arc suspension members.

According to German patent application P 34 20 557.8, PCT application No. DE-85-00190, and copending U.S. application Ser. No. 825,284, it is known within the art to employ a hydropneumatic suspension system having a circular-arc suspension member containing an hydraulic fluid which is distinguished by its compact external dimensions, extensive spring travel and capacity to absorb large forces. This prior art suspension is particularly suitable for use in tracked vehicles, such as armored vehicles, in which it is important to place the suspension system in the smallest possible space where it requires minimum maintenance and can be mounted with ease. However, this prior art suspension system does not reveal how it can be conveniently installed between the chassis components and the vehicle shell so as to comply with the requirements for easy assembly, maintenance freedom and minimum mounting space.

SUMMARY OF THE INVENTION

The invention has as its object the provision of a hydropneumatic suspension system of the type mentioned above and which is distinguished by a minimum mounting space and maintenance freedom and with which one can vary the spring travel and spring forces within a wide range.

According to copending application U.S. Ser. No. 825,284, a circular arc suspension system with a spring element comprises a casing for a spring bellows, the casing being curved approximately into an arc of a circle. A flow-connection is provided between the bellows and a pneumatic spring. A hydraulic fluid is provided in the bellows and one side of the pneumatic spring. An abutment plate is provided at one end of the bellows and is attached to a lever which is connected to one suspension element. The casing is attached to a different element. Movement of the elements relative to each other causes movement of the abutment plate so as to compressor expand the bellows, which compression or expansion changes the pressure on the pneumatic spring.

In one embodiment of this invention a circular-arc suspension member is located within a generally round housing between a support fitted within the housing and an abutment member pivoting around the housing axle. The housing is hinged on pivot points fixed on the vehicle by means of a suspension arm fitted within the housing and by a control arm which acts through a hinging lever attached to the abutment member. In the expanded (unloaded) position, the suspension arm, and control arm are essentially parallel and the joint between the control arm and the hinging lever is located to the side of the imaginary line connecting the pivot point of the control arm and the axle housing which is away from the suspension arm.

In a second embodiment of this invention, the suspension arm is hinged on a lower pivot point on the vehicle and the control arm is pivoted on a higher pivot point on the vehicle. In the expanded (unloaded) position, the hinge joint between the control arm and the hinging lever is located to the side of the imaginary line connecting the control arm pivot point and the housing axle which is toward the suspension arm.

In the first embodiment as described above, the pivot points fixed on the vehicle lie close to the chassis component so that the suspension setup can be fitted within the smallest possible space. All active members of the suspension system lie outside the vehicle. Even in the case of chassis components lying close together and sprung individually, each chassis component can be supported with a relatively large spring travel. The suspension setup for each chassis component part is readily accessible, which is beneficial to the mounting and to the rapid replacement of damaged or defective components. With the layout of the suspension consisting of but a fiew rugged component parts (because parts of the circular-arc suspension member form active parts of the control-arm parallelogram), the springiness and the magnitude of the forces to be absorbed can be varied within a wide range.

In the second embodiment, a toggle joint effect is achieved due to the counter-hinging with the toggle joint which bends toward the suspension arm and which, in the compressed state, can absorb practically infinitely large loads, resulting in very strognly progressive spring rates. Nevertheless, this specific embodiment of the suspension system also has a limited mounting space. It complies with the required maintenance freedom and easy assembly. The suspension system consists of but few component parts, because components that make up the circular-arc suspension member cooperate actively to the springing. Extensive spring travel can be accomplished. A desirable reduction of spring movements is achieved during compression, which is beneficial to the strongly progressive spring rate. Here, too, one can vary within a broad range the spring rate and the forces to be absorbed on account of the layout of the suspension.

In a third embodiment, the housing of the circular arc suspension mekber is integrated inside a wheel, such as the bogie wheel of a tracked vehicle. The bogie wheel pivots on the axle of the housing and preferably on a connecting shaft between the hinging lever and the abutment member. Since the circular-arc suspension member is integrated into the bogie wheel, additional mounting space is saved. The circular-arc suspension member is also assigned the function of the swivelling mounting of the bogie wheel. Furthermore, the circular-arc suspension member is concealed in the wheel so as to protect it from external influences.

In an alternative embodiment employing the configuration of the first embodiment the circular-arc suspension member is located away from the bogie wheel and the bogie wheel has as its axle an extension of the swivel joint where the control arm and the hinging lever are pivotally joined. In some cases, this simplifies the swivelling mounting of the bogie wheel and the connection of the circular-arc suspension member with the suspension components subjected to pressure, although the mounting space is slightly larger.

In yet another preferred embodiment, the circular-arc suspension member cooperates with a gas spring located either in the bogie wheel or in the suspension arm. The advantage is that the gas spring is not lodged within the vehicle, where it could endanger the vehicle crew in case of an accident or if hit by gunfire.

Favorable lever ratios and long spring travel according to the first embodiment can be obtained by selecting different length control arms, suspension arms and hinging levers. Preferably, the effective length of the control arm is at least as long as the distance between the suspension arm pivot and the housing axle and the hinging lever is almost one-half as long as the suspension arm.

Also according to the configuration of the first embodiment, it is preferred that the vertical distance between the chassis mounted pivot points is slightly greater than the length of the hinging lever. With this slightly asymmetrical configuration of the control-arm parallelogram, a reduction of movements between the vehicle and the chassis component is obtained with respect to the swivelling motion of the abutment for the circular-arc suspension member.

A particularly large reduction can also be achieved in the configuration of the second embodiment if the hinging lever is substantially as long as the control arm.

Finally, an extremely stable support for the chassis component in the second embodiment is obtained if the housing axle is located between the pivot points, as viewed from the side of the vehicle, because throughout the spring travel, the axis of the chassis component or of the circular-arc suspension member remains between the pivot points fixed on the vehicle.

DETAILED DESCRIPTION OF THE INVENTION

Figure 1:
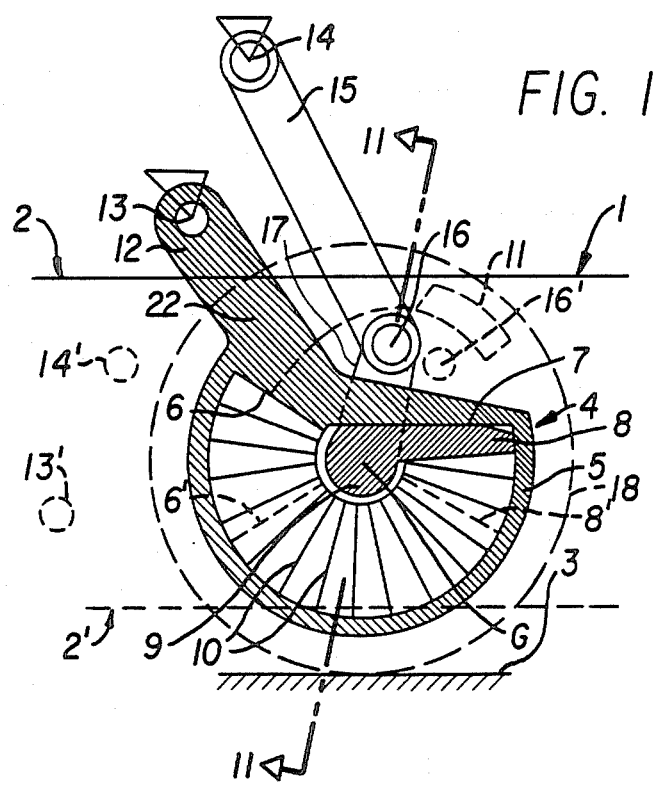
FIG. 1 is a schematic cross section through a hydropneumatic suspension system for a bogie wheel of an armored vehicle.
Figure 2:
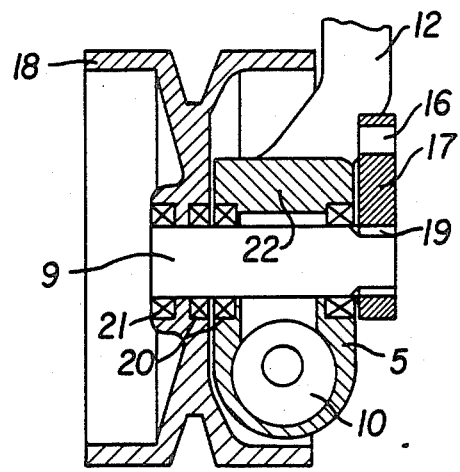
FIG. 2 is a cross-sectional view taken along the line II—II of FIG. 1.

FIGS. 1 and 2 show a hydropneumatic suspension setup 1 such as, for example, used in an armored vehicle for the spring mounting of the bogie wheel 18. A circular-arc spring 4 is used as the active suspension member. The detailed structure of the circular-arc suspension member will not be discussed herein, but particular reference is made to the contents of German patent application P 34 20 557.8, PCT Application No. DE-85-00190 and copending U.S. application Ser. No. 825,284, assigned to the same assignee and which is incorporated herein by reference, which details the construction of the circular-arc spring.

The hydropneumatic suspension setup 1 serves for the spring mounting of a tank hull 2 in relation to the ground (or a track resting on the ground) 3, in which a circular-arc. suspension member 4 is used as the active component, having a substantially round housing 5 in which are provided a radially extending support 6 as well as an abutment face 7 for a lever-shaped abutment 8 pivoting about the housing axle center line G. The abutment 8 is integrally connected with a shaft 9 pivoting about the housing axle center line G. Between the abutment 8 and the support 6 is located a suspension rember consisting of several segments 10. This suspension member is filled with an hydraulic fluid and cooperates with a gas spring 11 which, as denoted by the dotted line, may be fitted within the housing 5, outside the housing 5, or removed therefrom.

Attached to the housing 5 is a radially protruding suspension arm 12 which is hinged on a pivot point 13 fixedly connected with the tank hull 2. A parallel control arm 15 is hinged on a second, higher pivot point 14 of the tank hull 2 offset in relation to the housing axle G. This parallel control arm is connected to a hinging lever 17 via a hinge joint 16 so that they are foldable outwardly (to the right in FIG. 1). The hinging lever 17 itself is integrally connected with the shaft 9 within the housing 5. The wheel 18 is pivotally mounted with bearings 21 on an axle integral with or attached to the shaft 9 (FIG. 2). The hinging lever 17 is non-rotatably connected to the shaft 9 by means of a splined drive 19. The housing 5 is pivotally mounted with the housing part 22 carrying the support 6 and the abutment face 7 with bearings 20 on the shaft 9. The suspension arm 12 extends from the outside sideways and obliquely into the wheel to the housing 5. The segments 10 of FIGS. 1 and 2 form a spring bellows in the housing 5.

The suspension 1 according to FIG. 1 and FIG. 2 operates as follows:

The solid lines in FIG. 1 show the underside of the tank hull 2 when the suspension setup is in the expanded position. Upon application of a downwardly directed force to the tank hull 2, the pivot point 13 swivels downwards to the position 13' and rotates, in counter-clockwise direction, the housing 6 by means of the suspension arm 12 until the support 6 reaches the position 6'. At the same time, the pivot point 14 moves from the position denoted by the solid line to the position 14' and swings the swivel joint 16 to the position 16', causing the abutment 8 to be swung in clockwise direction to the position 8' and the spring bellows consisting of the segments 10 to be compressed. The hydraulic medium contained therein is displaced and applies pressure to the gas spring 11 which, when the force that loads the tank hull downwards is removed, it generates a restoring force with which the tank hull is raised anew until, finally, the position denoted by the solid lines is reached again. The tank hull can drop to the position 2'.

The parallel control arm 15 is substantially as long as the suspension arm 12 between the pivot point 13 and the housing axle G. The hinging lever 17 is approximately half as long as the suspension arm 12. If the hinging lever 17 is made longer and the parallel control arm 15 is shortened thereby, the swivelling motion of the hinging lever 17 during compression will traverse a smaller number of degrees of arc in clockwise direction, so that the compression of the spring bellows consisting of the segments 10—the suspension travel being equal—will become smaller, thereby changing the spring rate. Conversely, if one continues to shorten the hinging lever 17, the spring bellows will be compressed further. The spring rate can also be varied by the adjustment of the relative positions between the hinge joint 16 and the pivot points 13 and 14.

Figure 3:
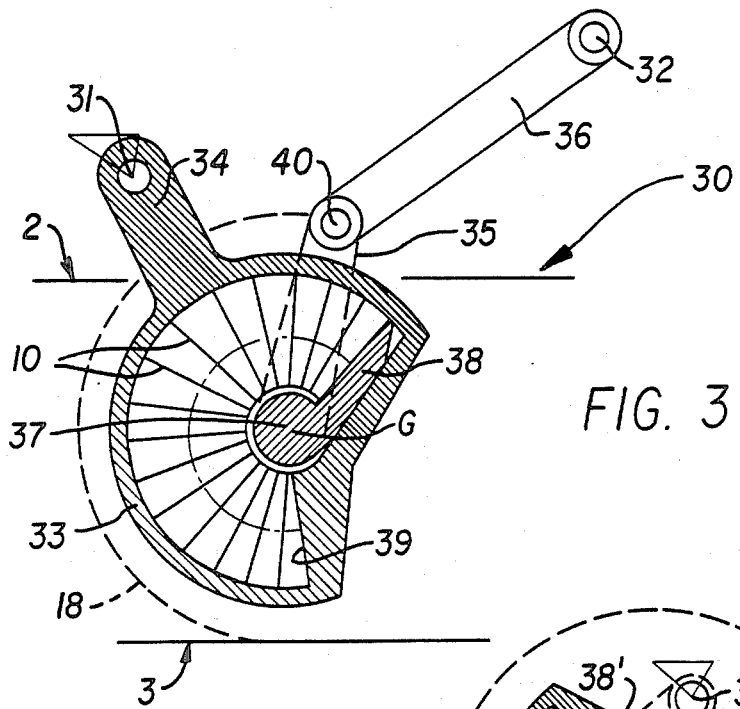
FIG. 3 is a cross-sectional view essentially corresponding to that of FIG. 1 through another embodiment of a hydropneumatic suspension setup, in the expanded position.
Figure 4:
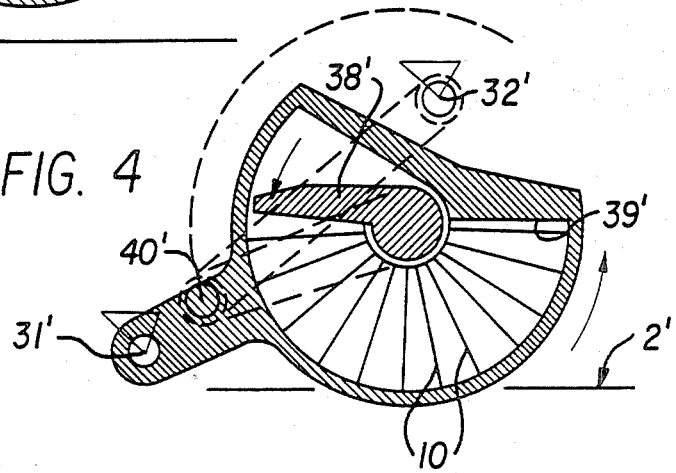
FIG. 4 is a cross-sectional view of the embodiment of FIG. 3 in the compressed position.

In the specific embodiment depicted in FIGS. 3 and 4, a circular-arc suspension member 30 with a slightly different layout is utilized, having a housing 33 with the support 39 as well as an abutment 38 which pivots about the housing axle G with a shaft 37. Again, the spring bellows consisting of individual segments 10, which are connected close together by hydraulic means, is incorporated betewen the abutment 38 and the support 39. Attached to the housing 33 is a radial suspension arm 34, which is hinged on a pivot point 31 of the tank hull 2. A hinging lever 35 connected to a pneumatic control arm 36 via a hinge joint 40 and capable of bending outwardly is connected with the shaft 37. The pneumatic control arm 36 itself can be swiveled at a second pivot point 32 of the tank hull 2. Again, the circular-arc suspension elenent 30 is integrated with the bogie wheel 18. In the expanded position of the suspension setup shown in FIG. 3, the hinge joint 40 is located on the side, turned toward the suspension arm 34, of an imaginary connecting line between the pivot point 32 and the housing axle G. This means that during compression, until the position shown in FIG. 4 is reached, the hinge joint 40 follows the swivelling motion occurring in clockwise direction of the suspension arm 35, so that the abutment 38 as well is swung in counterclockwise direction until the position 38' is reached. The support 39, too, swivels until the position 39' is reached. However, thanks to the lever ratio between the pneumatic control arm 36 and the hinging lever 35, the swivelling motion of the abutment 38 takes place over a degree of arc which is greater than the flexing swivelling motion of the support 39, causing the spring bellows consisting of the segments 10 to be compressed. However, with identical spring travel for the tank hull 2, a considerably smaller compression of the spring bellows results, so that, again, a different spring rate is obtained and, with small spring forces, very high loads can be absorbed on account of the toggle joint effect, during which, however, the spring rate becomes extremely progressive. It is obvious that, due to the change in the lever ratios, the change in the relative positions between the pivot points and the hinge joint 40 and the housing axle G, the spring rate and suspension travel can be varied within a broad range. In the compressed position of the suspension system, the pivot points 31 and 32 have reached the positions 31' and 32'. The hinge joint 40 is in the position 40' and the tank hull 2 has reached the lower position 2'.

Figure 5:
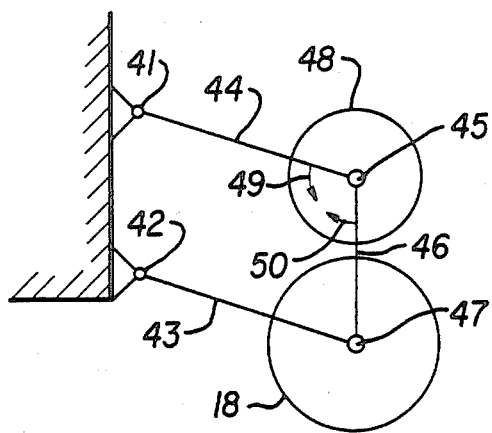
FIG. 5 is a schematic diagram of another specific embodiment of hydropneumatic suspension system.

In another embodiment depicted in FIG. 5, a circular-arc suspension member 48 is fitted with its housing 40 separated from the bogie wheel 18 at a hinge joint 45 of the control-arm parallelogram consisting of a suspension arm 44 hinged on the tank hull in an upper pivot point 41, a hinging lever 46 mounted between a housing axle 45 of the circular-arc suspension member 48 and a hinge joint 47, which is at the same time the rotational axis of the bogie wheel 18, a parallel control arm 43 connecting the hinge joint 47 with a lower pivot point 42 on the tank hull 2 and, finally, the part of the tank hull 2 located between the pivot points 41 and 42. During compression, the suspension 44 and the hinging lever 46 pivot toward each other about the housing axle 45 in the direction of the arrows 49 and 50, said motion being utilized for the compression of the spring bellows not shown in detail herein. True, slightly more mounting space is required for this solution, but the swivelling motion mounting of the bogie wheel 18 and the installation of the circular-arc suspension member 48 are simpler than in the previous solutions of prior art. Moreover, by varying the lever ratios and the relative positions of the pivot points and hinge joints, the spring rate and suspension travel can be varied at will.

We claim:

1. A hydropneumatic suspension for a vehicle having a chassis comprising:
   (a) a housing being in cross-section a sector of a circle, bearing a shaft at the origin of a circular portion and having fitted therein a circular-arc suspension member and an abutment member pivotally mounted about said shaft;
   (b) first and second pivot points mounted upon said chassis;
   (c) a suspension arm integral with or securely attached to said housing and pivotally mounted upon said chassis at said first pivot point;
   (d) a hinging lever having an inner end securely connected to said abutment member;
   (e) a control arm pivotally mounted upon said chassis at said second pivot point and pivotally connected to the outer end of said hinging lever by a hinge joint;
   (f) a gas spring; and
   (g) means for hydraulically connecting said gas spring to said circular-arc suspension member;
   wherein, when the suspension is in the extended position, said suspension arm and said control arm are essentially parallel and the hinge joint pivotally connecting said control arm and said hinging lever is located on the side of an imaginary line connecting said second pivot point and said shaft in said housing which is away from said suspension arm.

2. A hydropneumatic suspension for a vehicle having a chassis comprising:
   (a) a housing being in cross-section a sector of a circle, bearing a shaft at the origin of a circular portion and having fitted therein a circular-arc suspension member and an abutment member pivotally mounted about said shaft;
   (b) first and second pivot points mounted upon said chassis;
   (c) a suspension arm integral with or securely attached to said housing and pivotally mounted upon said chassis at said first pivot point;
   (d) a hinging lever having an inner end securely connected to said abutment member;
   (e) a control arm pivotally mounted upon said chassis at said second pivot point and pivotally connected to the outer end of said hinging lever by a hinge joint;
   (f) a gas spring; and
   (g) means for hydraulically connecting said has spring to said circular-arc suspension member;
   wherein said second pivot point is vertically displaced from said first pivot point, and when said suspension is in the extended position, said suspension arm and said control arm are not parallel, and said hinge joint pivotally connecting said control arm and said hinging lever is located on the side of an imaginary line connecting said second pivot point and said shaft in said housing which is toward said suspension arm.

3. A hydropneumatic suspension according to claim 1, which also comprises an axle integral with or securedly affixed to said shaft in said housing.

4. A hudropneumatic suspension according to claim 1 which also comprises an axle integral with or securedly affixed to said hinge joint pivotally connecting said control arm and said hinging lever.

5. A hydropneumatic suspension according to claim 3 wherein a wheel is rotatably attached to said axle.

6. a hydropneumatic suspension according to claim 4 wherein a wheel is rotatably attached to said axle.

7. A hydropneumatic suspension according to claim 5 wherein said wheel is a bogie wheel for a tracked vehicle.

8. A hydropneumatic suspension according to claim 6 wherein said wheel is a bogie wheel for a tracked vehicle.

9. A hydropneumatic suspension according to claim 2 which further comprises an axle integral with or attached to said shaft in said housing and a wheel rotatably attached to said axle.

10. A hydropneumatic suspension according to claim 9 wherein said wheel is a bogie wheel for a tracked vehicle.

11. A hydropneumatic suspension according to claim 1 wherein the distance between said second pivot point and the hinge joint pivotally connecting said control arm and said hinging lever is at least as long as the distance between said first pivot point and the shaft in said housing, and the distance between the hinge joint pivotally connecting said control arm and said hinging lever and said shaft in said housing is less than or equal to one-half of the distance between said first pivot point and said shaft in said housing.

12. A hydropneumatic suspension according to claim 11 wherein the vertical distance between said first and said second pivot points is greater than the distance between said hinge joint connecting said control arm and said hinging lever and said shaft in said housing.

13. A hydropneumatic suspension according to claim 2 wherein the distance between said hinge joint connecting said control arm and said hinging lever and said shaft in said housing is approximately the same length as the distance between said hinge joint connecting said control arm and said hinging lever and said second pivot point.

14. A hydropneumatic suspension according to claim 2 wherein, when the suspension is in the extended position, said first and second pivot points are on opposite sides of a plane defined by said shaft in said housing and the centerline of said hinging lever.

* * * * *